United States Patent Office 2,941,019
Patented June 14, 1960

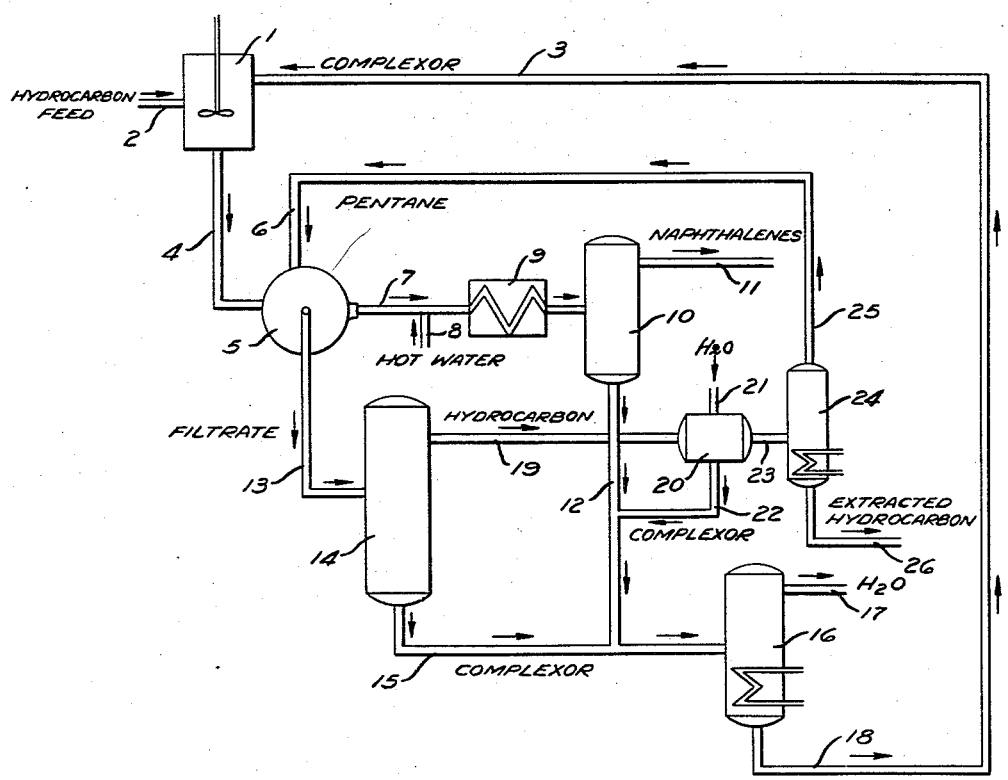

2,941,019

EXTRACTIVE CRYSTALLIZATION PROCESS FOR THE RECOVERY OF NAPHTHALENE FROM HYDROCARBON STOCKS UTILIZING POLYNITRO AROMATIC COMPOUNDS AS COMPLEXORS

Robert W. Foreman, Cleveland, and Arthur F. Miller, Wickliffe, Ohio, assignors to The Standard Oil Company, Cleveland, Ohio, a corporation of Ohio Filed Sept. 12, 1956, Ser. No. 609,442

9 Claims. (Cl. 260—674)

This invention, which is an improvement on that of Veatch et al. application Serial No. 492,036, filed March 3, 1955, for Naphthalene Extraction Process, relates to a process of separating fused polycyclic aromatic compounds from hydrocarbon mixtures containing the same.

Naphthalene is illustrative of these fused polycyclic aromatic compounds. It serves, among other purposes, as a raw material for the manufacture of phthalic anhydride, which is finding increasing use in "alkyd" resin manufacture. Heretofore, the primary source of naphthalene has been coal tar, but the supply from this source is not meeting the needs of the resin and other industries.

It is known that in a petroleum refinery numerous streams contain substantial amounts of naphthalene and its homologues; however, separation of these naphthalenes from other hydrocarbons by usual separation techniques has not been practicable. Solvent extraction does not separate the naphthalenes from other aromatic compounds; e.g., the alkylated monocyclics. Distillation cannot be used because the boiling point of naphthalene (425° F.) is too close to the boiling point of other hydrocarbons.

This invention relates to an improved liquid contacting process for separating the naphthalenes from the hydrocarbon stocks containing them. In accordance therewith, an immiscible solution of an agent which forms a complex or adduct with the naphthalenes (hereinafter called a "complexor") is emulsified with the hydrocarbon stock. This is done under conditions conducive to the formation of solid complexes from which the naphthalenes are recovered. The complexor remaining after the naphthalenes have been removed is available for use for treating an additional amount of hydrocarbon stock. In the meantime, the immiscible liquid complexor phase is separated from the liquid hydrocarbon phase, which is used for the purposes to which it is usually applied. After re-introducing the complexor and, if necessary, adjusting the concentration, the liquid complexor phase is recycled. Thus the process does not use up the complexor, which is recycled without the need for regeneration.

The invention will be better understood from a consideration of the following discussion of the various aspects thereof:

*The hydrocarbon stock to be treated and the compounds to be separated.*—The hydrocarbon stocks that can be treated in accordance with the invention may be any that contain an appreciable amount of fused polycyclic aromatic compounds. Examples are the naphthalenes which, as used herein, include naphthalene ($C_{10}H_8$) and its homologues and analogues, including the methyl and ethyl naphthalenes, the naphthols, phenanthrene, anthracene and corresponding substituted compounds, such as ethyl phenanthrene and anthraquinone. The various hydrocarbons with which the fused polycyclics occur in the stock to be treated may boil in the same range or below or above the fused polycyclics. They may consist of aliphatic hydrocarbons, naphthenes, monocyclic aromatics and sometimes heterocyclic compounds. These are not separated by the process to any appreciable extent.

Any stock may be used as long as it is liquid under the treating conditions. The amount of the fused polycyclic aromatic compounds in the stock to be treated may vary from a fraction of one percent to a major portion. Usually the stock has from 0.05% to 50% of fused polycyclic aromatic compounds, most often from 1% to 15%. The larger the amount, the greater the efficiency of the process. Examples of stocks and the amount of fused polycyclics therein are as follows:

| | Percent |
|---|---|
| Catalytic distillate | 0.5 to 5.0 |
| Thermal reformate | 2.0 to 8.0 |
| Decoker gas oil | 0.1 to 5.0 |
| Coker gas oil | 0.1 to 5.0 |

Other examples are to be found in fractions of these wherein the desired polycyclics have been concentrated by distillation.

*The complexor.*—A number of compounds are useful as complexors and the materials which form complexes with fused polycyclic aromatic compounds are known or can be ascertained from the literature. These compounds are selective complexors for naphthalene even in the presence of large amounts of toluene. Most, if not all, of these materials have high boiling points which are above the boiling point of the fused polycyclic aromatic compounds and the complexes formed therewith. This permits decomposition of the complexes and recovering of these compounds without adversely affecting the complexor. Preferred for the purposes of the invention are the polynitro aromatic compounds, especially monocyclic, such as picric acid, trinitrofluorenone, dinitrosalicylic acid, picramic acid, dinitrochlorobenzene, dinitrophenol, trinitrotoluene, etc. Picric acid is believed to be the most suitable.

*The complexor solvent.*—The solvent that is employed should have the following characteristics. It should be a liquid that is emulsifiable rather than miscible with the hydrocarbon stock under the conditions of treatment. Therefore, it should be substantially insoluble in the hydrocarbon stock. The hydrocarbon stock should have a minimum solubility in the solvent. It should be a solvent for the complexor to such an extent that it dissolves an adequate amount. It must not react chemically with the complexor or otherwise adversely affect it.

Examples of suitable solvents are water, glycols, especially ethylene glycols, and mixtures thereof. Diethylene glycol (DEG) and triethylene glycol (TEG) are glycols that are especially suitable; in addition, triethylene glycol, especially aqueous mixtures thereof, is an excellent solvent for picric acid and analogous polynitro aromatic compounds. The presence of water helps minimize the solubility of the hydrocarbons in the solvent.

The concentration of the complexor in the solution may be varied. The maximum concentration is determined by the solubility of the particular complexor in the particular solvent. The lower limit will be determined by economic considerations. Small amounts require the use of more solution for a given amount of separation, with the consequent lowering of over-all efficiency. Generally as high a concentration will be used as practical, up to and including fully saturated solutions.

*Treating conditions.*—The solution of the complexor and hydrocarbon stock to be treated are emulsified by any suitable technique, such as by stirring, shaking, passing a gas through it, or other types of agitation. The time of mixing should be sufficient to assure formation of substantially all of the complexes that will separate out as a solid in a reasonable time. The length of the mixing time is a function of the thoroughness of mixing; i.e., the more thorough the mixing, the shorter will be the time required. Generally the mixing time will be from 10 seconds to 10 minutes; as a rule, one to ten minutes is adequate. The complex formation is not a slow reaction and prolonged mixing times are not required.

The proportion of the complexor solution and the hydrocarbon stock should be such as to provide sufficient complexor to form solid complexes. This will depend in part on the concentration of the complexor in the solution and in part on the molal ratio of the complexor and the fused polycyclic aromatic compounds in the complexes that are formed. For example, if one mol of a given aromatic compound is to be separated from a hydrocarbon stock and a solid complex with a one to one mol ratio forms with a given complexor, then sufficient complexor solution should be used, taking into account the concentration of the complexor in the solution, to provide at least one mol of complexor. Generally, an excess of complexor above the theoretical is preferred, such as a molal ratio from about 2 to 1 up to about 10 to 1.

The process is generally carried out at atmospheric pressure but super-atmospheric pressures may be used to minimize loss due to evaporation.

The temperature should be sufficiently low to favor the formation of the desired complexes. Generally, it should be below about 150° F. As a rule, the lower the temperature, the more nearly complete is the complex formation. As illustrative, in one system, a temperature of 75° F. gave an efficiency of 53.2%, 33° F. gave an efficiency of 54.0%, and 0° F. gave an efficiency of 57.1%. The temperature must be above the freezing point of the mixture, but excessively low temperatures which do not add to the recovery are uneconomic. In general, however, increased efficiencies in recovery due to lower temperatures tend to justify their use.

*Recovery of naphthalenes.*—The solid complexes so formed may be removed in any convenient way, as by means of rotary filters, suction filters, plate and frame filters, decanters, centrifugal separators or the like. The cake or slurry thus obtained is then processed to break down the complexes. This may be done in any one of a variety of different ways, as by heating with water under pressure to a temperature of 200° to 300° F., steam stripping, or heat stripping in the absence of added water or steam. In some circumstances, particularly where picric acid is employed as the complexor, it is desirable to avoid techniques which bring the complexor into or leave it in a molten state, this because of explosion risks that may be involved. Precautions are required if picric acid is to be handled in molten condition.

Preferred procedure involves the addition of water and heating under pressure to a temperature of 250° to 300° F. This permits of the use of a settling unit maintained at a temperature not too far above the melting point of naphthalene; e.g., 180° F. or perhaps a little more. In such circumstances, the impure naphthalenes can usually be drawn off at the top and the mixture of complexor and water can usually be withdrawn at the bottom of the settling unit, although it should be noted that whether the naphthalenes rise to the top or settle to the bottom depends on the amount and density of the impurities. After having been drawn off, the impure naphthalenes can be purified in known ways. The mixture of complexor and water is returned to the system.

*Recycling.*—After filtration or the like has removed the solid complexes, the filtrate may be settled to resolve it into its two immiscible phases. One of these phases is a complexor solution phase containing some dissolved complexes; the other is a hydrocarbon phase that is now deficient in naphthalenes. The former can advantageously be reused and is therefore recycled, being employed to treat additional amounts of hydrocarbon stock. The complexor remaining after removal of the naphthalenes as described above may be added to it and recycled with it. If other adjustment in its composition is required, such as the removal of excess water, this adjustment is made before recycling.

The invention will be better understood from the following examples and from the accompanying drawing, which are illustrative.

In the system shown in the drawing, the hydrocarbon mixture and the complexor solution are fed into a mixer 1 through lines 2 and 3, respectively. If desired, the mixer may be equipped with heating or cooling elements to provide a temperature gradient, in which case the temperature near the top of the mixer may in a typical case be in the range between about 75° and about 150° F. and the temperature near the bottom of the mixer may be in the range between about 30° and about 75° F. Under such conditions, the complexes tend to separate out in solid form, facilitating their removal from the bottom of the mixer through line 4.

Line 4 leads to a continuous rotary filter 5 in which the complexes so separated out are concentrated to form a wet cake. This cake is washed within the filter with pentane supplied through line 6. After washing, the washed complexes leave the filter through line 7. Hot water is admitted to line 7 by means of a branch line 8. The slurry so formed is heated under pressure in heater 9 to a temperature in the range between about 250° and about 300° F. In the heater, the complexes break down into the components from which they were formed; to wit, the complexor and the naphthalenes that it is desired to recover.

After leaving heater 9, the slurry proceeds to a settling unit 10 maintained at a temperature of approximately 180° F. At this temperature, the impure naphthalenes are in the liquid state. In a typical case, being lighter than water as a result of the presence of impurities, they tend to float to the top, this not withstanding the fact that pure naphthalenes are heavier than water. They are removed from the settling unit through line 11 for further treatment; e.g., purification. The complexor, the solvent therefor, and the water introduced through line 8 are withdrawn through line 12 at the bottom of the settling unit.

In the meanwhile, the filtrate resulting from removal of the solid complexes leaves filter 5 through line 13. It proceeds to a settling unit 14 operating under ambient temperature conditions. In settling unit 14, it separates into two distinct phases, one the complexor solution phase and the other a hydrocarbon phase. The latter is characterized by a deficiency of naphthalenes, which have largely been removed by filter 5. The complexor solution leaves settling unit 14 through line 15, which conducts it to dehydrator 16. Line 12 from settling unit 10 discharges as shown into line 15. In dehydrator 16, excess water is driven off through line 17 in the form of steam. Thus concentrated, the complexor solution leaves dehydrator 16 through line 18, proceeding to mixer 1 as indicated by arrows.

The naphthalene-deficient hydrocarbon phase leaves the top of settling unit 14 through line 19. It proceeds to a scrubber 20, in which water removes any remaining complexes and any unreacted complexor that may have persisted in the hydrocarbon to this stage. Water is supplied to the scrubber through line 21. The water so introduced, together with complexes and complexor removed by means of it, leaves scrubber 20 through line 22. The latter discharges into the line 12 carrying the complexor away from settling unit 10. The naphthalene-deficient hydrocarbon leaves scrubber 20 through a line 23 leading to a pentane stripper 24 in which the pentane used as a wash in filter 5 is removed. Leaving stripper 24 through line 25, the pentane is returned to the system as indicated by arrows.

As can be seen from the drawing, the complexor, whether derived from settling unit 10 or from the scrubbing operation carried out in scrubber 20, is recycled. The complexor solution, which is removed from settling unit 14 through line 15, is recombined with the complexor prior to entry of the complexor solution into dehydrator 16. Its concentration adjusted by removal of excess water through line 17, the complexor solution is recycled as already described. The extracted hydrocarbon leaves the system through a line 26 at the bottom of pentane stripper 24. The recovered naphthalenes, now in concentrated form, leave the system through line 11.

Examples based on actual experimental operation of the above-described process are given below.

EXAMPLE I

Four hundred cubic centimeters of a catalytic distillate concentrate containing 8.46% naphthalene were mixed for a period of 10 minutes with 400 cc. of a complexing solution containing 90 grams of picric acid dissolved in 20% aqueous triethylene glycol. Mixing was accomplished in a 1 liter Morton flask equipped with an efficient stirrer. The mixing temperature was maintained at 33° F. by immersing the flask in a constant temperature bath. Dense yellow crystals formed almost immediately. The hydrocarbon and complexor phase were separated, and the complexor phase was filtered to remove the solid. The solid was washed with pentane and steam-distilled to recover the naphthalene. The hydrocarbon phase was washed with a 2% solution of potassium hydroxide to remove any remaining picric acid. The efficiency of naphthalene recovery amounted to 54% with a selectivity of 67%.

EXAMPLE II

Four hundred cubic centimeters of a catalytic distillate concentrate containing 8.46% naphthalene were mixed for a period of ten minutes with 400 cc. of a complexing solution consisting of 90 grams of picric acid dissolved in 20% aqueous triethylene glycol. The mixing temperature was maintained at 75° F. Solid crystals formed almost immediately. The mixture was allowed to stand overnight in a separatory funnel, and the hydrocarbon and complexor phase were separated. A solution of potassium hydroxide was added to the hydrocarbon layer to remove excess picric acid. The complexor phase was filtered and the solid complex was washed with pentane and steam-distilled. The efficiency of naphthalene recovery amounted to 53.2% with a selectivity of 36.7%.

The foregoing examples are representative of the procedures that may be employed, which may vary widely from one to another.

In practicing the process, the effect of temperature may be seen from the following tabulation:

Table I

EFFECT OF TEMPERATURE

[Stock: Catalytic distillate concentrate containing 8.46% total naphthalenes]

| Conc. of picric acid, g./liter solvent | Temp. ° F. | Solvent | Mixing time (min.) | Percent efficiency | Percent selectivity |
|---|---|---|---|---|---|
| 225 | 0 | 20% aq. TEG | 20 | 57.1 | 59.47 |
| 225 | 33 | ---do--- | 10 | 54.0 | 67.00 |
| 225 | 75 | ---do--- | 10 | 53.2 | 36.69 |

The effect of water concentration may be seen from the following tabulation:

Table II

[Stock: Catalytic distillate concentrate containing 8.46% total naphthalenes]

| Conc. of picric acid, g./liter solvent | Temp. ° F. | Solvent | Mixing time (min.) | Percent efficiency |
|---|---|---|---|---|
| 0 | 75 | 10% aq. TEG | 1 | 15.7 |
| 0 | 75 | 20% aq. TEG | 1 | 8.6 |
| 250 | 75 | 10% aq. TEG | 1 | 45.3 |
| 225 | 75 | 20% aq. TEG | 1 | 47.2 |
| 250 | 75 | 10% aq. TEG | 10 | 53.2 |
| 225 | 75 | 20% aq. TEG | 10 | 53.2 |

It is evident that the process as described above lends itself to wide variations as regards such factors as times, temperatures, pressures, concentrations, treating media, etc. Because of the varying effects of these and like factors, the optimum conditions for carrying out the process cannot always be predicted with certainty. In commercial practice, therefore, the process as carried out on a plant scale may involve departures from the conditions and results hereinabove set forth as likely to obtain. In general, such departures will be well within the skill of those versed in the art to which the invention relates.

It is intended that the patent shall cover, by summarization in appended claims, all features of patentable novelty residing in the invention.

What is claimed is:

1. A process of separating fused polycyclic aromatic compounds from hydrocarbon stocks containing the same which comprises emulsifying the hydrocarbon stock in a liquid phase with an amount of a liquid phase solution of a polynitro aromatic compound, which is a complexor for said aromatic compounds, in a solvent consisting essentially of a glycol and water which is substantially insoluble in said hydrocarbon stock to form a solid complex between the polynitro aromatic complexor and said fused polycyclic aromatic compounds, said amount of liquid phase complexor solution being sufficient to form the solid complex but insufficient to dissolve said complex, and the amount of complexor in said solution being at least the theoretical amount to form a complex with the fused polycyclic aromatic compounds, separating out the solid complex, separating the liquid complexor solution phase after removal of the solid complex from the liquid hydrocarbon phase, returning the liquid complexor solution phase to the system, and decomposing the solid complex and recovering said aromatic compounds.

2. The process of claim 1 in which the complexor is a polynitro phenol.

3. The process of claim 1 in which the complexor is picric acid.

4. The process of claim 1 in which the glycol is triethylene glycol.

5. The process of claim 1 in which the fused polycyclic aromatic compound is a naphthalene.

6. A process of separating naphthalenes from hydrocarbon stocks containing the same which comprises emulsifying the hydrocarbon stock in a liquid phase with an amount of a liquid phase solution of a polynitro aromatic compound, which is a complexor for said naphthalenes, in a solvent consisting essentially of a glycol and water, which is substantially insoluble in said hydrocarbon stock, to form a solid complex between the polynitro aromatic complexor and said naphthalenes, said amount of liquid phase complexor solution being sufficient to form a solid complex but insufficient to dissolve said complex, and the amount of polynitro aromatic complexor in said solution being at least the theoretical amount to form a complex with said naphthalenes, separating out the solid complex, decomposing said complex to yield naphthalenes and said polynitro aromatic complexor, separating the liquid complexor solution phase after removal of the solid complex from the liquid hydrocarbon phase, adding the recovered polynitro aromatic complexor to the liquid complexor solution phase, and returning the liquid complexor solution phase to the system.

7. The process of claim 6 in which the solid complex is decomposed at superatmospheric temperatures.

8. The process of claim 6 in which the solid complex is decomposed at superatmospheric pressures.

9. The process of claim 6 in which the solid complex is decomposed in the presence of added water.

References Cited in the file of this patent

UNITED STATES PATENTS

| 2,652,435 | Hess et al. | Sept. 15, 1953 |
| 2,681,337 | Gorin | June 15, 1954 |
| 2,739,144 | Kelley | Mar. 20, 1956 |
| 2,786,085 | Bloch | Mar. 19, 1957 |

OTHER REFERENCES

Pfeffer, Ber., vol. 55, pages 413–429 (1922); page 419 only needed.